(12) United States Patent
Ju et al.

(10) Patent No.: US 10,171,162 B2
(45) Date of Patent: Jan. 1, 2019

(54) APPARATUS AND METHOD FOR MEASURING FREQUENCY RESPONSE CHARACTERISTICS OF OPTICAL TRANSMITTER AND OPTICAL RECEIVER

(71) Applicant: Fujitsu Limited, Kawasaki-shi, Kanagawa (JP)

(72) Inventors: Cheng Ju, Beijing (CN); Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/476,123

(22) Filed: Mar. 31, 2017

(65) Prior Publication Data

US 2017/0288771 A1    Oct. 5, 2017

(30) Foreign Application Priority Data

Mar. 31, 2016   (CN) .......................... 2016 1 0196192

(51) Int. Cl.
*H04B 10/548*  (2013.01)
*H04B 10/079*  (2013.01)
*H04B 10/69*   (2013.01)
*H04L 27/26*   (2006.01)

(52) U.S. Cl.
CPC ....... *H04B 10/0795* (2013.01); *H04B 10/548* (2013.01); *H04B 10/691* (2013.01); *H04L 27/2637* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0249978 A1* | 10/2011 | Sasaki | ..................... | H04J 14/02 398/140 |
| 2014/0199073 A1* | 7/2014 | Yu | ......................... | H04L 5/0048 398/76 |
| 2016/0308612 A1* | 10/2016 | Zhao | ................ | H04B 10/07955 |

* cited by examiner

*Primary Examiner* — David Payne
*Assistant Examiner* — Omar S Ismail
(74) *Attorney, Agent, or Firm* — Staas & Halsey LLP

(57) ABSTRACT

An apparatus and method for measuring frequency response characteristics of an optical transmitter and an optical receiver where the apparatus includes: a generating unit configured to generate a driving signal for driving the modulator of the optical transmitter, which comprises at least two frequencies; and a calculating unit configured to respectively calculate the frequency response characteristics of the optical transmitter and the optical receiver according to output signal components in output signals of the optical receiver corresponding to at least two detection signal components of identical amplitudes and different frequencies in detection signals. The frequency response characteristics of the optical transmitter and the optical receiver may be obtained, the amplitude responses and phase responses in the frequency response characteristics may be respectively obtained, and the measurement results are accurate and reliable.

14 Claims, 5 Drawing Sheets

APPARATUS AND METHOD FOR MEASURING FREQUENCY RESPONSE CHARACTERISTICS OF OPTICAL TRANSMITTER AND OPTICAL RECEIVER

CROSS-REFERENCE TO RELATED APPLICATIONS

This application claims the benefit of Chinese Application No. 201610196192.7 filed Mar. 31, 2016, in the Chinese Intellectual Property Office, the disclosure of which is incorporated herein by reference.

BACKGROUND

1. Field

The present disclosure relates to the field of communications, and in particular to an apparatus and method for measuring frequency response characteristics of an optical transmitter and an optical receiver.

2. Description of the Related Art

Optical communications systems occupy an important position in communications transmission networks for their huge transmission bandwidths, giant capacity expansion potentials, very low transmission loss and low costs. As the development of high-speed digital-to-analog conversion (DAC) chips, analog-to-digital conversion (ADC) chips and digital signal processing (DSP) chips, digital coherent communications technologies become a main stream tendency in next generation communications.

Frequency response characteristics include amplitude responses and phase responses. In an optical communications system, frequency response characteristics of an optical transmitter and an optical receiver are important system performance indices, and accurate measurement of the frequency response characteristics of the optical transmitter and the optical receiver is extremely important to the normal operation of the system. As excess of operating frequencies of the optical transmitter and the optical receiver by dozens of GHz, accurate measurement of the frequency response characteristics becomes more and more difficult.

Existing methods for measuring frequency response characteristics of an optical transmitter and an optical receiver include the following: a pulse spectrum analysis method, in which a frequency response of a receiver is measured by transmitting a high-speed optical instantaneous pulse, and detecting a spectral shape of the received pulse by the receiver; an optical outer difference detection method, in which two lasers of different frequencies are coupled, photoelectric detection is performed on coupled optical signals, and power of the electrical signals are detected by an electrical spectral analyzer, to measure frequency response characteristics; and an optical intensity noise method, in which optical signals with spontaneous radiation noises is inputted into an optical-to-electric converter, and spectra of the electric signals are measured by using an electrical spectrum analyzer, to measure frequency response characteristics.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the embodiments.

However, as frequency response characteristics of an optical transmitter and an optical receiver are hard to be separated from a final detection signal, the above existing methods are difficult to measure a phase response of the optical receiver, and the respective frequency response characteristics of the optical transmitter and the optical receiver cannot be obtained. Furthermore, as increases measurement bandwidth occur, accurate measurement becomes more and more difficult.

Embodiments of the present disclosure provide an apparatus and method for measuring frequency response characteristics of an optical transmitter and an optical receiver, by which the respective frequency response characteristics of the optical transmitter and the optical receiver may be obtained, the amplitude responses and phase responses in the frequency response characteristics may be respectively obtained, and the measurement results are accurate and reliable.

According to the first aspect of the embodiments of the present disclosure, there is provided an apparatus for measuring frequency response characteristics of an optical transmitter and an optical receiver; wherein, the optical transmitter includes a modulator, and the optical receiver includes a photoelectric detector, the modulator of the optical transmitter being connected to the photoelectric detector of the optical receiver, and signals outputted by the modulator being inputted into the photoelectric detector; the apparatus including: a generating unit configured to generate a driving signal for driving the modulator of the optical transmitter, which comprises at least two frequencies; and a calculating unit configured to respectively calculate the frequency response characteristics of the optical transmitter and the optical receiver according to output signal components in output signals of the optical receiver corresponding to at least two detection signal components of identical amplitudes and different frequencies in detection signals; wherein, the detection signals are detection signals being performed photoelectric conversion by the photoelectric detector of the optical receiver.

According to the second aspect of the embodiments of the present disclosure, there is provided a method for measuring frequency response characteristics of an optical transmitter and an optical receiver; wherein, the optical transmitter includes a modulator, and the optical receiver includes a photoelectric detector, the modulator of the optical transmitter being connected to the photoelectric detector of the optical receiver, and signals outputted by the modulator being inputted into the photoelectric detector; the method including: generating a driving signal for driving the modulator of the optical transmitter, which comprises at least two frequencies; and respectively calculating the frequency response characteristics of the optical transmitter and the optical receiver according to output signal components in output signals of the optical receiver corresponding to at least two detection signal components of identical amplitudes and different frequencies in detection signals; wherein, the detection signals are detection signals being performed photoelectric conversion by the photoelectric detector of the optical receiver.

An advantage of the embodiments of the present disclosure exists in that the optical transmitter and the optical receiver are directly connected, to obtain at least two detection signal components of identical amplitudes and different frequencies in the photoelectrical converted detection signals, and by using the output signal components in the output signals of the optical receiver corresponding to the at least two detection signal components, the frequency response characteristics of the optical transmitter and the optical receiver may be respectively calculated, the amplitude responses and phase responses in the frequency response characteristics may be respectively obtained, and the measurement results are accurate and reliable.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

The apparatus for measurement and the method for measurement provided by the embodiments of this disclosure may measure an existing optical transmitter and an existing optical receiver. Structures of an optical transmitter and an optical receiver taken as measurement objects of the embodiments of this disclosure shall be illustrated below.

Figure 1:
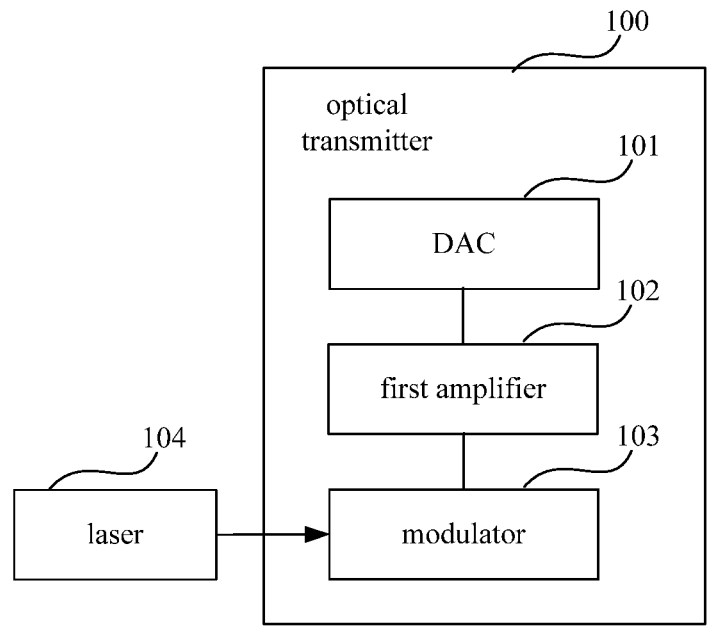
FIG. 1 is a schematic diagram of an optical transmitter of embodiments of this disclosure.

FIG. 1 is a schematic diagram of an optical transmitter of an embodiment of this disclosure. As shown in FIG. 1, the optical transmitter 100 includes a digital-to-analog converter (DAC) 101, a first amplifier 102 and a modulator 103. A digital driving signal drives the modulator 103 after passing through the digital-to-analog converter 101 and the first amplifier 102, and the modulator 103 modulates laser emitted by a laser 104 taken as a light source, and outputs a modulated optical signal.

Figure 2:
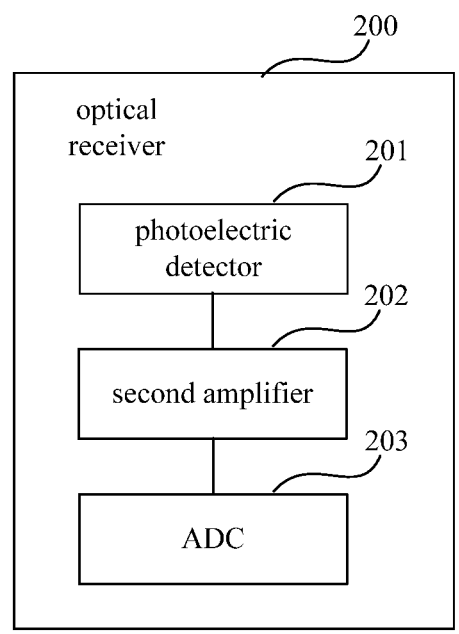
FIG. 2 is a schematic diagram of an optical receiver of embodiments of this disclosure.

FIG. 2 is a schematic diagram of an optical receiver of an embodiment of this disclosure. As shown in FIG. 2, the optical receiver 200 includes a photoelectric detector 201, a second amplifier 202 and an analog-to-digital converter (ADC) 203. The photoelectric detector 201 receives an optical signal transmitted by the transmitter, the optical signal is inputted into the second amplifier 202 after optical-to-electrical conversion, and a digital signal is obtained after the optical signal passes through the analog-to-digital converter 203.

The optical transmitter shown in FIG. 1 and the optical receiver shown in FIG. 2 are illustrative only, and the optical transmitter and the optical receiver may further include other existing structures.

In performing measurement by using the apparatus for measurement and the method for measurement of the embodiments of this disclosure, the optical transmitter and the optical receiver are directly connected. For example, the optical transmitter and the optical receiver may be connected by using a small section of optical fiber. The modulator of the optical transmitter and the photoelectric detector of the optical receiver are connected, and an optical signal outputted by the modulator does not pass through an optical fiber transmission link, but is directly inputted into the photoelectric detector.

Processes of measurement of frequency response characteristics of the optical transmitter and the optical receiver by using the apparatus for measurement and the method for measurement of the embodiments of this disclosure shall be described below in detail.

Embodiment 1

Figure 3:
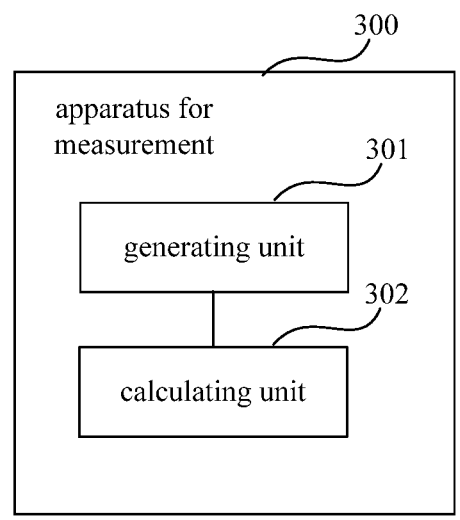
FIG. 3 is a schematic diagram of the apparatus for measurement of Embodiment 1 of this disclosure.

An embodiment of this disclosure provides an apparatus for measuring frequency response characteristics of an optical transmitter and an optical receiver. FIG. 3 is a schematic diagram of the apparatus for measurement of Embodiment 1 of this disclosure. As shown in FIG. 3, the apparatus 300 includes:

a generating unit 301 configured to generate a driving signal for driving the modulator of the optical transmitter, which includes at least two frequencies; and a calculating unit 302 configured to respectively calculate the frequency response characteristics of the optical transmitter and the optical receiver according to output signal components in output signals of the optical receiver corresponding to at least two detection signal components of identical amplitudes and different frequencies in detection signals; wherein, the detection signals are detection signals being performed photoelectric conversion by the photoelectric detector of the optical receiver.

Figure 4:
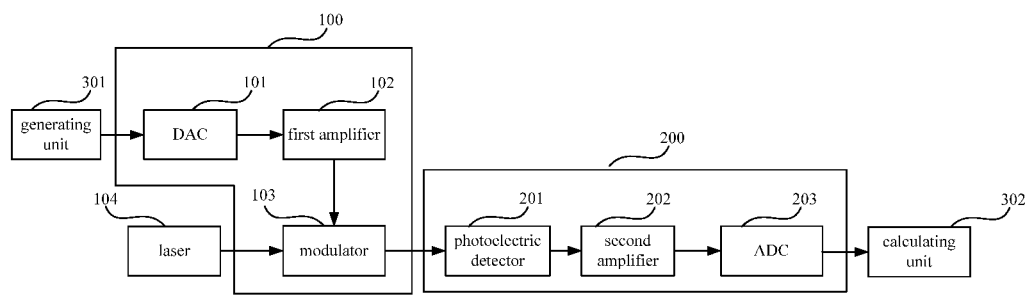
FIG. 4 is a schematic diagram of measuring the optical transmitter and the optical receiver by using the apparatus for measurement of Embodiment 1 of this disclosure.

FIG. 4 is a schematic diagram of measuring the optical transmitter and the optical receiver by using the apparatus for measurement of Embodiment 1 of this disclosure. As shown in FIG. 4, the generating unit 301 is configured to generate the driving signal for driving the modulator 103 of the optical transmitter 100. The digital driving signal passes through the digital-to-analog converter 101 and the first amplifier 102, and then is inputted into the modulator 103 to drive the modulator 103. A modulated optical signal is obtained after laser emitted by the laser 104 is modulated by the modulator 103. The modulated optical signal is directly inputted into the photoelectric detector 201 of the optical receiver 200. A detection signal is obtained after optical-to-electrical conversion is performed on the optical signal by the photoelectric detector 201. The detection signal is inputted into the calculating unit 302 after passing through the second amplifier 202 and the analog-to-digital converter 203; in this embodiment, the detection signal obtained by optical-to-electrical conversion by the photoelectric detector 201 includes at least two detection signal components of identical amplitudes and different frequencies.

It can be seen from the above embodiment that the optical transmitter and the optical receiver are directly connected, to obtain at least two detection signal components of identical amplitudes and different frequencies in the photoelectrical converted detection signals, and by using the output signal components in the output signals of the optical receiver corresponding to the at least two detection signal components, the frequency response characteristics of the optical transmitter and the optical receiver may be respectively calculated, the amplitude responses and phase responses in the frequency response characteristics may be respectively obtained, and the measurement results are accurate and reliable.

In this embodiment, an existing modulator may be used as the modulator in the optical transmitter. For example, the modulator is a Mach-Zehnder (MZM) modulator.

In this embodiment, an existing photoelectric detector capable of performing optical-to-electrical conversion may be used as the photoelectric detector in the optical receiver. For example, the photoelectric detector may be a photo diode.

In this embodiment, the driving signal generated by the generating unit 301 and used for driving the modulator of the optical transmitter includes signals of at least two frequencies. For example, the driving signal is a group of orthogonal frequency division multiplexing (OFDM) symbols including at least two OFDM symbols. However, a form of the driving signal is not limited in the embodiment of this disclosure.

In this embodiment, the number of the OFDM symbols in the group of OFDM symbols may be set according to an actual situation, such as being set according to bandwidths of the optical transmitter and the optical receiver.

The driving signal of the modulator of this embodiment shall be illustrated below taking one group of OFDM symbols as an example.

Figure 5:
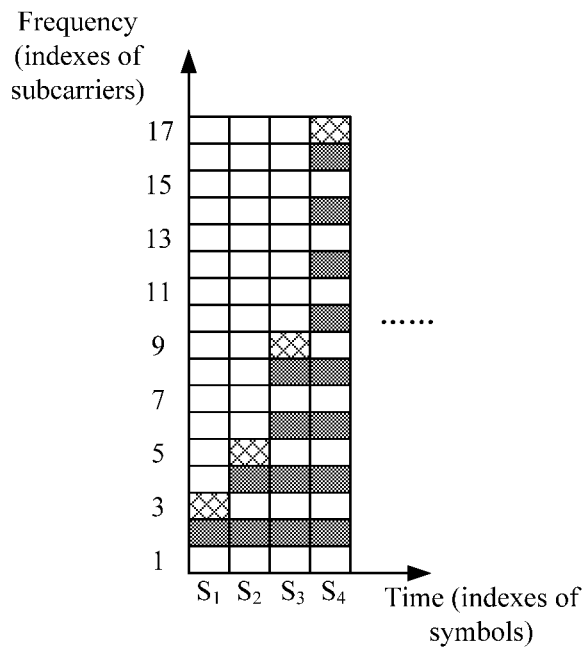
FIG. 5 is a schematic diagram of a driving signal of a modulator of Embodiment 1 of this disclosure.

FIG. 5 is a schematic diagram of the driving signal of the modulator of Embodiment 1 of this disclosure. As shown in FIG. 5, the driving signal is one group of OFDM symbols, which includes N chronological orthogonal frequency division multiplexing symbols, S1, S2, S3, . . . , SN, each OFDM symbol including one or more first subcarriers and one or more second subcarriers, and description shall be given to S1-S4 in FIG. 5. The first subcarriers are denoted by ▨ in FIG. 5, and the second subcarriers are denoted by ▢ in FIG. 5. In this embodiment, the first subcarriers are also referred to as "data subcarriers", and the second subcarriers are also referred to as "radio frequency (RF) subcarriers".

As shown in FIG. 5, for the M-th orthogonal frequency division multiplexing symbol, the data subcarriers are arranged in all even-numbered subcarriers of the M-th orthogonal frequency division multiplexing symbol of frequencies less than or equal to that of a 2M-th subcarrier, the radio frequency subcarrier is arranged in a (2M+1)-th subcarrier of the M-th orthogonal frequency division multiplexing symbol, and positions of other subcarriers are empty; wherein, power of the radio frequency subcarriers is greater than or equal to power of the first subcarriers, M and N are positive integers, and M≤N.

For example, as shown in FIG. 5, for the first OFDM symbol S1, the subcarrier in the second subcarrier is the data subcarrier, the subcarrier in the third subcarrier is the radio frequency subcarrier, and the rest subcarriers are set to be empty, the radio frequency subcarrier and the data subcarriers respectively occupying ½ of power of the first OFDM symbol; for the second OFDM symbol S2, the subcarriers in the second and the fourth subcarriers are data subcarriers, the subcarrier in the fifth subcarrier is the radio frequency subcarrier, and the rest subcarriers are set to be empty, the radio frequency subcarrier occupying ½ of power of the second OFDM symbol, and the two data subcarriers in the second and the fourth subcarriers jointly occupying ½ of power of the second OFDM symbol; for the third OFDM symbol S3, the subcarriers in the second, the fourth, the sixth and the eighth subcarriers are the data subcarriers, the subcarrier in the ninth subcarrier is the radio frequency subcarrier, and the rest subcarriers are set to be empty, the radio frequency subcarrier occupying ½ of power of the third OFDM symbol, and the four data subcarriers in the second, the fourth, the sixth and the eighth subcarriers jointly occupying ½ of power of the third OFDM symbol; and so on.

Hence, proportions occupied by the at least two detection signal components of identical amplitudes and different frequencies in the photoelectrical converted detection signal may be ensured to be relatively large by setting the power of the second subcarriers (the radio frequency subcarriers) to be greater than or equal to that of the first subcarriers (the data subcarriers), thereby further improving precision of the measurement.

In this embodiment, an existing OFDM modulation method may be used by the generating unit 301 for generating the driving signal constituted by a group of OFDM symbols. For example, the driving signal constituted by a group of OFDM symbols may be obtained through processing steps of serial-to-parallel transformation, symbol mapping and IFFT operations, parallel-to serial transformation and addition of a cyclic prefix, etc.

In this embodiment, as shown in FIG. 4, the driving signal generated by the generating unit 301 is a digital signal, and the driving signal after passing through the digital-to-analog converter 101 may be expressed by formula (1) below:

$$s(n) = \sum_{k=2m}^{2^M} D(k)\cos\left(\frac{2\pi kn}{N} + \theta_k\right) + A_{2^M+1} D(k)\cos\left(\frac{2\pi(2^M+1)n}{N} + \theta_{2^M+1}\right); \quad (1)$$

where, s(n) denotes the driving signal after passing through the digital-to-analog converter, D(k) and $\theta_k$ respectively denote information on an amplitude and a phase of a data subcarrier modulated in a k-th subcarrier, M is an index of an OFDM symbol, $A_2M_{+1}$ and $\theta_2M_{+1}$ are an amplitude and a phase of a radio frequency subcarrier, $2^M+1$ is an index of the radio frequency subcarrier, N denotes the number of points of IFFT/FFT transform, m denotes an index of a subcarrier, and n denotes a discrete time sampling index, k, m, n and M being positive integers.

In this embodiment, the driving signal s(n) after passing through the first amplifier 103 and before being inputted into the modulator 103 may be expressed by formula (2) below:

$$s_T(n) = \sum_{k=2m}^{2^M+1} H_T(k)D(k)\cos\left(\frac{2\pi kn}{N} + \theta_k + \varphi_k\right) + H_T(2^M+1)A_{2^M+1}\cos\left(\frac{2\pi(2^M+1)n}{N} + \theta_{2^M+1} + \varphi_{(2^M+1)}\right); \quad (2)$$

where, $s_T(n)$ denotes the driving signal after passing through the first amplifier 102, $H_T(k)$ and $\varphi_k$ respectively denote amplitude and phase responses of the transmitter at a k-th subcarrier, $H_T(2^M+1)$ and $\varphi(2^M+1)$ respectively denote amplitude and phase responses of the transmitter at a position of a radio frequency subcarrier, D(k) and $\theta_k$ respectively denote information on the amplitude and the phase of the data subcarrier modulated in the k-th subcarrier, M is the index of the OFDM symbols, $A_2M_{+1}$ and $\theta_2M_{+1}$ are the amplitude and the phase of the radio frequency subcarrier, $2^M+1$ is the index of the radio frequency subcarrier, N denotes the number of the points of IFFT/FFT transform, m denotes the index of the subcarrier, and n denotes the discrete time sampling index, k, m, n and M being positive integers.

In this embodiment, $s_T(n)$ is inputted into the modulator 103 to drive the modulator 103, an optical signal obtained after the laser emitted by the laser 104 is modulated by the modulator 103 may be expressed by formula (3) below:

$$e_T(n) = \sum_{k=2m}^{2^M+1} H_T(k)D(k)e^{j\left(\frac{2\pi kn}{N}+\theta_k+\varphi_k\right)} + H_T(2^M+1)A_{2^M+1}e^{j\left[\frac{2\pi(2^M+1)n}{N}+\theta_{2^M+1}+\varphi_{(2^M+1)}\right]} + \sum_{k=2m}^{2^M+1} H_T(k)D(k)e^{-j\left(\frac{2\pi kn}{N}+\theta_k+\varphi_k\right)} + H_T(2^M+1)A_{2^M+1}e^{-j\left[\frac{2\pi(2^M+1)n}{N}+\theta_{2^M+1}+\varphi_{(2^M+1)}\right]}; \quad (3)$$

where, $e_T(n)$ denotes the optical signal after being modulated by the modulator 103, the optical signal being a double-sideband optical signal, and upper and lower sidebands mutually conjugating, $H_T(k)$ and $\varphi_k$ respectively denote amplitude and phase responses of the transmitter at the k-th subcarrier, $H_T(2^M+1)$ and $\varphi(2^M+1)$ respectively denote amplitude and phase responses of the transmitter at the position of the radio frequency subcarrier, D(k) and $\theta_k$ respectively denote information on an amplitude and a phase of the data subcarrier modulated in each subcarrier, k is the index of the subcarrier, M is the index of the OFDM symbols, $A_2M_{+1}$ and $\theta_2M_{+1}$ are amplitude and phase values of the radio frequency subcarrier, $2^M+1$ is the index of the radio frequency subcarrier, N denotes the number of the points of IFFT/FFT transform, m denotes the index of the subcarrier, and n denotes the discrete time sampling index, k, m, n and M being positive integers.

In this embodiment, the optical signal after being photo-electrical converted by the photoelectric detector 201 may be expressed by formula (4) below:

$$s_R(n) = |e_T(n)|^2 = 2rH_T^2(2^M+1)A_{2^M+1}^2 + \quad (4)$$

$$\mathrm{Re}\Bigg\{2rA_{2^M+1}H_T(2^M+1)\sum_{k=2m}^{M} H_R(2^M+1-k)H_T(k)D(k)$$

$$e^{j\left(\frac{2\pi(2^M+1-k)n}{N}+\theta_{2^M+1}+\varphi_{2^M+1}-\theta_k-\varphi_k+\phi_{2^M+1-k}\right)}\Bigg\} +$$

$$\mathrm{Re}\Bigg\{2A_{2^M+1}rH_T(2^M+1)\sum_{k=2m}^{2^M} H_R(2^M+1+k)H_T(k)D(k)$$

$$e^{j\left(\frac{2\pi(2^M+1+k)n}{N}+\theta_{2^M+1}+\varphi_{2^M+1}+\theta_k+\varphi_k+\phi_{2^M+1+k}\right)}\Bigg\} +$$

$$rH_T^2(2^M+1)A_{2^M+1}^2 e^{j\left[\frac{2\pi(2^M+1+2)n}{N}+2\theta_{2^M+1}+2\varphi_{(2^M+1)}\right]} +$$

$$r\mathrm{Re}\Bigg\{H_{TR}(2^M+1)A_{2^M+1}e^{-j\left[\frac{2\pi(2^M+1)n}{N}+\varphi_{(2^M+1)}\right]} +$$

$$H_{TR}(2^M+1)A_{2^M+1}e^{-j\left[\frac{2\pi(2^M+1)n}{N}+\varphi_{(2^M+1)}\right]}\Bigg|^2\Bigg\};$$

where, $H_R(k)$ and $\phi_k$ respectively denote amplitude and phase responses of a receiver end at the k-th subcarrier, $H_T(k)$ and $\varphi_k$ respectively denote amplitude and phase responses of the transmitter at the k-th subcarrier, $H_T(2^M+1)$ and $\varphi(2^M+1)$ respectively denote amplitude and phase responses of the transmitter at the position of the radio frequency subcarrier, D(k) and $\theta_k$ respectively denote the information on the amplitude and the phase of the data subcarrier modulated in each subcarrier, k is the index of the subcarrier, M is the index of the OFDM symbol, $A_2M_{+1}$ and $\theta_2M_{+1}$ are the amplitude and phase values of the radio frequency subcarrier, $2^M+1$ is the index of the radio frequency subcarrier, r denotes a efficiency coefficient of the optical-to-electric converter, N denotes the number of the points of IFFT/FFT transform, m denotes the index of the subcarrier, and n denotes the discrete time sampling index, k, m, n and M being positive integers.

In this embodiment, the second and third items in the right part of the equal sign of formula (4) constitute a cross item of the data subcarriers and the radio frequency subcarriers, that is, they constitute the at least two detection signal components of identical amplitudes and different frequencies in the photoelectrical converted detection signal.

In this embodiment, an output signal of the receiver is obtained after the detection signal passes through the second amplifier 202 and the analog-to-digital converter 203, and the output signal is inputted into the calculating unit 302; for the output signal, it may be demodulated by using an existing demodulation method. For example, demodulated OFDM symbols are obtained by such processing steps as symbol synchronization, cyclic prefix removal, serial-to-parallel conversion, and fast Fourier transform (FFT), etc.

In this embodiment, the calculating unit 302 respectively calculates the frequency response characteristics of the optical transmitter and the optical receiver according to output signal components in the output signal of the optical receiver corresponding to the at least two detection signal components of identical amplitudes and different frequencies in the detection signal; for example, the amplitude responses and phase responses of the optical transmitter and the optical receiver at frequency spots of the subcarriers may be sequentially calculated in an order of OFDM symbols in the output signal.

A structure of the calculating unit 302 and a method for calculating the frequency response characteristics of the optical transmitter and the optical receiver shall be illustrated below.

Figure 6:
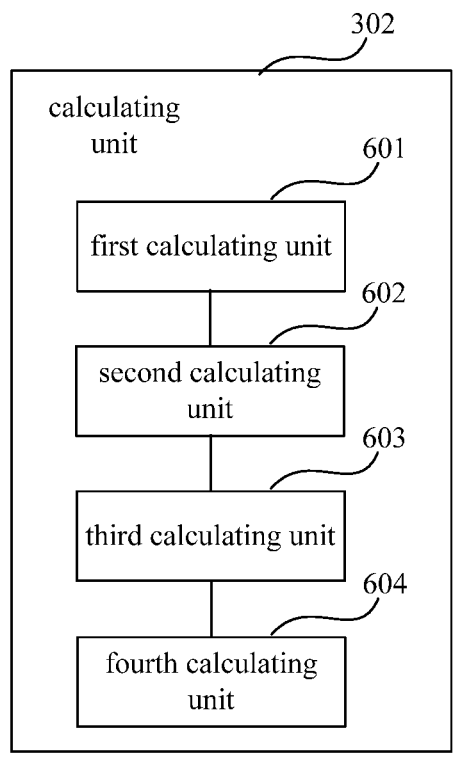
FIG. 6 is a schematic diagram of the calculating unit 302 of Embodiment 1 of his disclosure.

FIG. 6 is a schematic diagram of the calculating unit 302 of Embodiment 1 of this disclosure. As shown in FIG. 6, the calculating unit 302 includes:

a first calculating unit 601 configured to, for the first orthogonal frequency division multiplexing symbol, calculate a frequency response characteristic of the optical receiver corresponding to a frequency spot of the fifth subcarrier according to the first subcarrier and the fifth subcarrier of the first orthogonal frequency division multiplexing symbol of the output signal of the optical receiver, and calculate the frequency response characteristic of the optical receiver corresponding to a frequency spot of the third subcarrier according to the frequency response characteristic of the optical receiver corresponding to the frequency spot of the fifth subcarrier and a predetermined frequency response characteristic at a frequency spot of the first subcarrier;

a second calculating unit 602 configured to, for the M-th orthogonal frequency division multiplexing symbol, calculate a frequency response characteristic of the optical transmitter corresponding to a frequency spot of a $[2^M+1]$-th subcarrier according to all odd-numbered subcarriers in a $[2^{M-1}+1, 2^M-1]$-th subcarrier of the M-th orthogonal frequency division multiplexing symbol in the output signal of the optical receiver; where, $2<M\leq N$;

a third calculating unit 603 configured to calculate frequency response characteristics of the optical transmitter corresponding to frequency spots of all even-numbered subcarriers in a $[2^{M-1}+2 \boxtimes 2^M]$-th subcarrier according to all odd-numbered subcarriers in a $[1,2^{M-1}-1]$-th subcarrier of the M-th orthogonal frequency division multiplexing symbol in the output signal of the optical receiver; where, $2<M\leq N$; and a fourth calculating unit 604 configured to calculate frequency response characteristics of the optical receiver corresponding to frequency spots of all odd-numbered subcarriers according to all odd-numbered subcarriers in a $[2^M+3 \boxtimes 2^{M+1}+1]$-th subcarrier of the M-th orthogonal frequency division multiplexing symbol in the output signal of the optical receiver; where, $2<M\leq N$.

In this embodiment, it is assumed that the amplitude responses $H_T(2)$ and $H_T(3)$ of the optical transmitter at frequency spots of the second subcarrier and the third subcarrier and the amplitude response $H_R(1)$ of the optical receiver at the frequency spot of the first subcarrier are all 1, and the phase responses $\varphi_2$ and $\varphi_3$ of the optical transmitter at the frequency spots of the second subcarrier and the third subcarrier and the phase response $\varnothing_1$ of the optical receiver at the frequency spot of the first subcarrier are all 0.

In this embodiment, the first calculating unit 601 calculates an amplitude response $H_R(5)$ and a phase response $\varnothing_S$ of the optical receiver corresponding to the frequency spot of the fifth subcarrier according to the first subcarrier and the fifth subcarrier of the first orthogonal frequency division multiplexing symbol of the output signal of the optical receiver, and calculates an amplitude response $H_R(3)$ and a phase response $\varnothing_3$ of the optical receiver corresponding to the frequency spot of the third subcarrier according to the amplitude response $H_R(5)$, the phase response $\varnothing_S$ and a predetermined amplitude response $H_R(1)$ and phase response $\varnothing_1$, such as obtaining $H_R(3)$ and $\varnothing_3$ by using a method for calculating a mean value.

In this embodiment, for the M-th orthogonal frequency division multiplexing symbol, $2<M\leq N$, and the second calculating unit 602 calculates the frequency response characteristic of the optical transmitter corresponding to the frequency spot of the $[2^M+1]$-th subcarrier according to all the odd-numbered subcarriers in the $[2^{M-1}+1, 2^M-1]$-th subcarrier of the M-th orthogonal frequency division multiplexing symbol in the output signal of the optical receiver.

For example, the frequency response characteristic of the optical transmitter corresponding to the frequency spot of the $[2^M+1]$-th subcarrier may be calculated according to formula (5) below:

$$= \sum_{i=0}^{2^{M-2}} \frac{H_T(2^M+1)e^{j(\theta_{2^M+1})}}{2rA(2^M+1)e^{j(\theta_{2^M+1})}H_T(2^{M-1}-2i)e^{-j(\varphi_{2^{M-1}-2i})}}; \quad (5)$$

$$D(2^{M-1}-2i)e^{-j(\theta_{2^{M-1}-2i})}$$

where, $H_T(2^M+1)e^{j(\theta_{2^M+1})}$ denotes the frequency response characteristic of the optical transmitter corresponding to the frequency spot of the $[2^{M+1}]$-th subcarrier, M is the index of the OFDM symbol, $A(2^M+1)$ and $\theta_{2^M+1}$ are the amplitude and phase values of the radio frequency subcarrier, $2^M+1$ is the index of the radio frequency subcarrier, and r denotes the efficiency coefficient of the optical-to-electric converter, i being an integer greater than or equal to 0.

In this embodiment, for the M-th orthogonal frequency division multiplexing symbol, $2<M\leq N$, and the third calculating unit 603 calculates the frequency response characteristics of the optical transmitter corresponding to the frequency spots of all the even-numbered subcarriers in the $[2^{M-1}+2 \boxtimes 2^M]$-th subcarrier according to all the odd-numbered subcarriers in the $[1,2^{M-1}-1]$-th subcarrier of the M-th orthogonal frequency division multiplexing symbol in the output signal of the optical receiver.

For example, the frequency response characteristics of the optical transmitter corresponding to the frequency spots of all the even-numbered subcarriers in the $[2^{M-1}+2☒2^M]$-th subcarrier may be calculated according to formula (6) below:

$$= \frac{\begin{pmatrix} H_T(2^M+2+2i)e^{j(\phi_{2^{M-1}+2+2i})} \\ (i=[0, 2^{M-2}])R(2^{M-1}-1)e^{j(\phi_{2^{M-1}-1})} \end{pmatrix}}{2rA(2^M+1)e^{j(\theta_{2^M+1})}H_T(2^M+1)e^{j(\varphi_{2^M+1})}H_T(2^{M-1}-1)} \cdot e^{j(\phi_{2^{M-1}-1})}D(2^{M-1}+2+2i)e^{-j(\phi_{2^{M-1}+2+2i})}$$  (6)

where, $H_T(2^{M-1}+2+2i)e^{j(\Phi_{2^{M-1}+2+2i})}$ denotes the frequency response characteristics of the optical transmitter corresponding to the frequency spots of all the even-numbered subcarriers in the $[2^{M-1}+2☒2^M]$-th subcarrier, i is an index of the subcarrier, i=$[0☒2^{M-2}]$, M is the index of the OFDM symbol, $A(2^{M+1})$ and $\theta_2 M_{+1}$ are the amplitude and phase values of the radio frequency subcarrier, $2^M+1$ is the index of the radio frequency subcarrier, and r denotes the efficiency coefficient of the optical-to-electric converter.

In this embodiment, for the M-th orthogonal frequency division multiplexing symbol, 2<M≤N, and the fourth calculating unit 604 calculates the frequency response characteristics of the optical receiver corresponding to the frequency spots of all the odd-numbered subcarriers according to all th odd-numbered subcarriers in the $[2^M+3☒2^{M+1}+1]$-th subcarrier of the M-th orthogonal frequency division multiplexing symbol in the output signal of the optical receiver.

For example, the frequency response characteristics of the optical receiver corresponding to the frequency spots of all the odd-numbered subcarriers may be calculated according to formula (7) below:

$$= \frac{H_R(2^M+2+2i)e^{j(\phi_2 M_{+2+2i})}(i=[0, 2^{M-1}])}{2rA(2^M+1)e^{j(\theta_2 M_{+1})}H_T(2^M+1+2i)e^{j(\varphi_2 M_{+2+2i})}} \cdot \frac{R(2^M+2+2i)e^{j(\rho_2 M_{+2+2i})}}{H_T(2+2i)e^{j(\varphi_2+2i)}D(2+2i)e^{j(\theta_2+2i)}}$$  (7)

where, $H_R(2^M+2+2i)e^{j(\Phi_2 M_{+2+2i})}$ denotes the frequency response characteristics of the optical receiver corresponding to the frequency spots of all the odd-numbered subcarriers, i is the index of the subcarrier, i=$[0☒2^{M-2}]$, M is the index of the OFDM symbol, $A(2^M+1)$ and $\theta_2 M_{+1}$ are the amplitude and phase values of the radio frequency subcarrier, $2^M+1$ is the index of the radio frequency subcarrier, and r denotes the efficiency coefficient of the optical-to-electric converter.

For example, after the amplitude response $H_R(5)$ and the phase response $\varnothing_5$ of the optical receiver corresponding to the frequency spot of the fifth subcarrier and the amplitude response $H_R(3)$ and the phase response $\varnothing_3$ of the optical receiver corresponding to the frequency spot of the third subcarrier are calculated, data of the first, third, seventh and ninth subcarriers are extracted from the second OFDM symbol of the output signal of the optical receiver, the frequency response characteristic of the optical transmitter corresponding to the frequency spot of the fifth subcarrier and the frequency response characteristic of the optical receiver corresponding to the frequency spot of the seventh subcarrier may be obtained based on the data of the data of the third and seventh subcarriers, and the frequency response characteristic of the optical transmitter corresponding to the frequency spot of the fourth subcarrier and the frequency response characteristic of the optical receiver corresponding to the frequency spot of the ninth subcarrier may be obtained based on the data of the data of the first and fourth subcarriers in the second OFDM symbol of the output signal of the optical receiver; then, data of the first, third, fifth, seventh, eleventh, thirteenth, fifteenth and seventeenth subcarriers are extracted from the third OFDM symbol of the output signal of the optical receiver, the frequency response characteristic of the optical transmitter corresponding to the frequency spot of the ninth subcarrier and the frequency response characteristics of the optical receiver corresponding to the frequency spots of the eleventh and thirteenth subcarriers may be obtained based on the data of the fifth, seventh, eleventh and thirteenth subcarriers, the frequency response characteristic of the optical transmitter corresponding to the frequency spot of the sixth subcarrier and the frequency response characteristic of the optical receiver corresponding to the frequency spot of the fifteenth subcarrier may be obtained based on the data of the third and fifteenth subcarriers in the third OFDM symbol of the output signal of the optical receiver, the frequency response characteristic of the optical transmitter corresponding to the frequency spot of the eighth subcarrier and the frequency response characteristic of the optical receiver corresponding to the frequency spot of the seventeenth subcarrier may be obtained based on the data of the first and seventeenth subcarriers in the third OFDM symbol of the output signal of the optical receiver, and so on.

With the above recursive calculation process, the amplitude responses and phase responses of the optical transmitter and the optical receiver corresponding to the frequency spots of the subcarriers may be obtained.

It can be seen from the above embodiment that the optical transmitter and the optical receiver are directly connected, to obtain at least two detection signal components of identical amplitudes and different frequencies in the photoelectrical converted detection signals, and by using the output signal components in the output signals of the optical receiver corresponding to the at least two detection signal components, the frequency response characteristics of the optical transmitter and the optical receiver may be respectively calculated, the amplitude responses and phase responses in the frequency response characteristics may be respectively obtained, and the measurement results are accurate and reliable.

Embodiment 2

Figure 7:
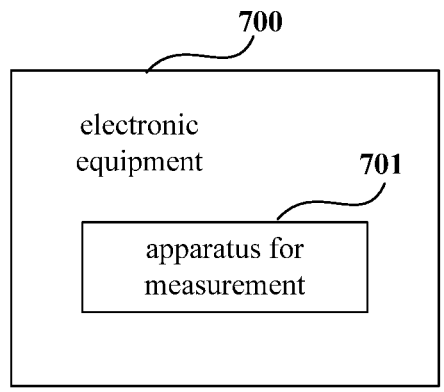
FIG. 7 is a schematic diagram of the electronic equipment of Embodiment 2 of this disclosure.

An embodiment of this disclosure further provides electronic equipment. FIG. 7 is a schematic diagram of the electronic equipment of Embodiment 2 of this disclosure. As shown in FIG. 7, the electronic equipment 700 includes an apparatus 701 for measuring, a structure and functions of the apparatus 700 for measuring being the same as those described in Embodiment 1, and being not going to be described herein any further.

Figure 8:
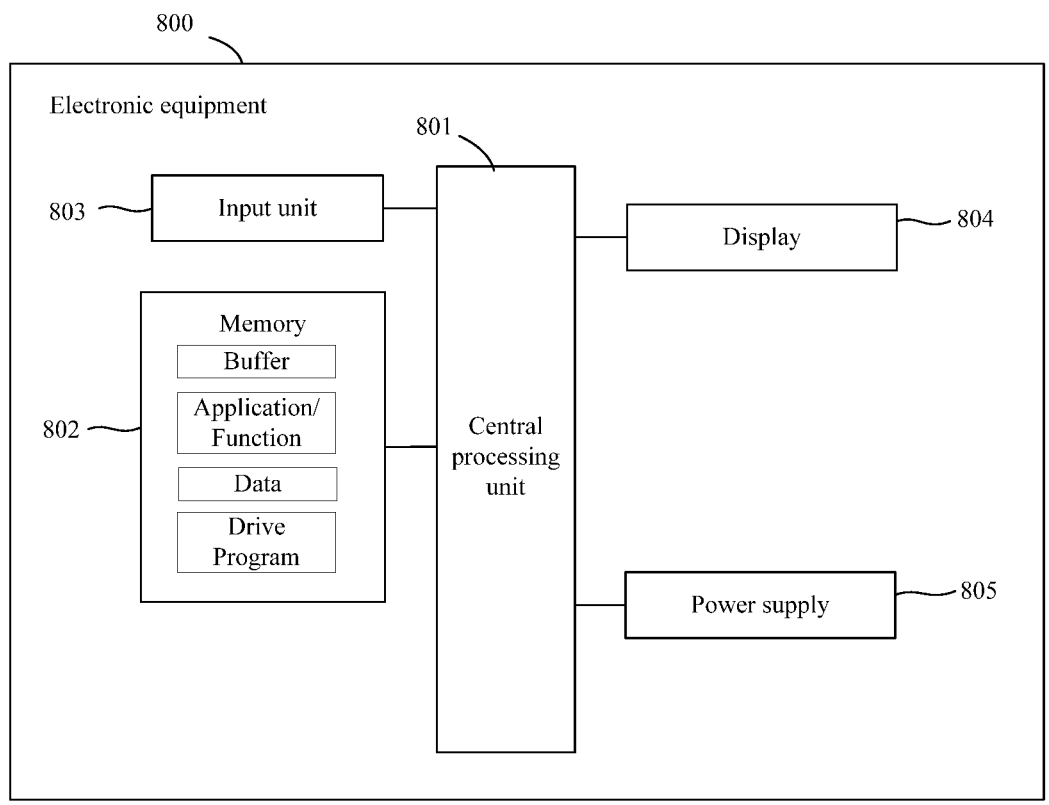
FIG. 8 is a block diagram of a systematic structure of the electronic equipment of Embodiment 2 of this disclosure.

FIG. 8 is a block diagram of a systematic structure of the electronic equipment of Embodiment 2 of this disclosure. As shown in FIG. 8, the electronic equipment 800 may include a central processing unit 801 and a memory 802, the memory 802 being coupled to the central processing unit 801. This figure is illustrative only, and other types of structures may also be used, so as to supplement or replace this structure and achieve telecommunications function or other functions.

As shown in FIG. 8, the electronic equipment 800 may further include an input unit 803, a display 804 and a power supply 805.

In an implementation, the functions of the apparatus for measurement described in Embodiment 1 may be integrated into the central processing unit 801; for example, the central processing unit 801 may be configured to: generate a driving signal for driving the modulator of the optical transmitter, and respectively calculate the frequency response characteristics of the optical transmitter and the optical receiver according to output signal components in output signals of the optical receiver corresponding to at least two detection signal components of identical amplitudes and different frequencies in detection signals; wherein, the detection signals are detection signals being performed photoelectric conversion by the photoelectric detector of the optical receiver.

For example, the generated driving signal is a group of orthogonal frequency division multiplexing symbols comprising at least two orthogonal frequency division multiplexing symbols.

For example, the orthogonal frequency division multiplexing symbols in the group of orthogonal frequency division multiplexing symbols include one or more first subcarriers and one or more second subcarriers; and wherein, power of the second subcarriers is greater than or equal to power of the first subcarriers.

For example, the group of orthogonal frequency division multiplexing symbols comprises N chronological orthogonal frequency division multiplexing symbols; wherein, for the M-th orthogonal frequency division multiplexing symbol, the first subcarriers are arranged in all even-numbered subcarriers of the M-th orthogonal frequency division multiplexing symbol of frequencies less than or equal to that of a $2^M$-th subcarrier, and the second subcarrier is arranged in a $(2^M+1)$-th subcarrier of the M-th orthogonal frequency division multiplexing symbol; and wherein, M and N are positive integers, and M≤N.

For example, for the orthogonal frequency division multiplexing symbols, the at least two detection signal components of identical amplitudes and different frequencies in the detection signals are at least two cross terms of the first subcarriers and the second subcarriers in the detection signals.

In this embodiment, the electronic equipment 800 does not necessarily include all the parts shown in FIG. 8.

As shown in FIG. 8, the central processing unit 801 is sometimes referred to as a controller or control, and may include a microprocessor or other processor devices and/or logic devices. The central processing unit 801 receives input and controls operations of every components of the electronic equipment 800.

The memory 802 may be, for example, one or more of a buffer memory, a flash memory, a hard drive, a mobile medium, a volatile memory, a nonvolatile memory, or other suitable devices, which may store predefined or preconfigured information, and may further store a program executing related information. And the central processing unit 801 may execute the program stored in the memory 802, to realize information storage or processing, etc. Functions of other parts are similar to those of the relevant art, which shall not be described herein any further. The parts of the electronic equipment 800 may be realized by specific hardware, firmware, software, or any combination thereof, without departing from the scope of the present disclosure.

It can be seen from the above embodiment that the optical transmitter and the optical receiver are directly connected, to obtain at least two detection signal components of identical amplitudes and different frequencies in the photoelectrical converted detection signals, and by using the output signal components in the output signals of the optical receiver corresponding to the at least two detection signal components, the frequency response characteristics of the optical transmitter and the optical receiver may be respectively calculated, the amplitude responses and phase responses in the frequency response characteristics may be respectively obtained, and the measurement results are accurate and reliable.

Embodiment 3

Figure 9:
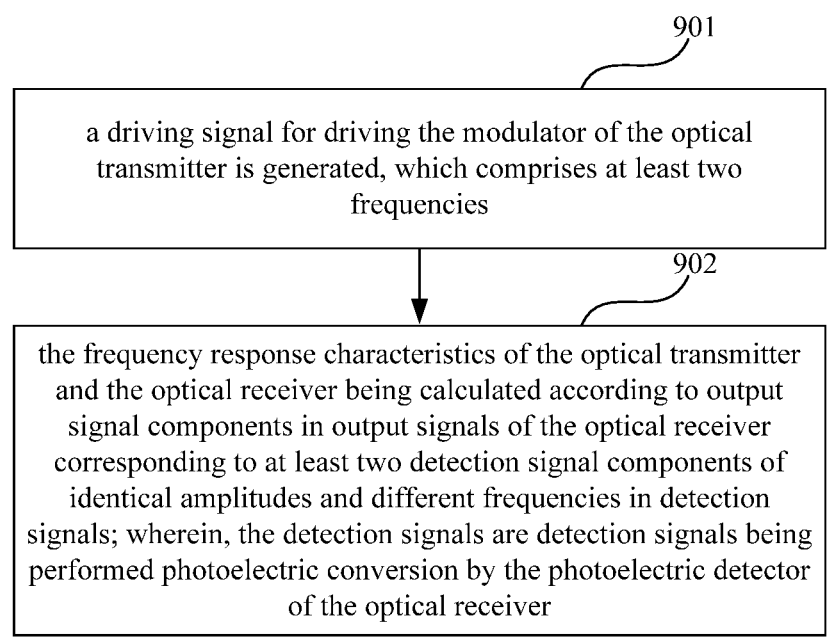
FIG. 9 is a flowchart of the method for measurement of Embodiment 3 of this disclosure.

An embodiment of this disclosure further provides a method for measuring frequency response characteristics of an optical transmitter and an optical receiver, corresponding to the apparatus for measurement of Embodiment 1. FIG. 9 is a flowchart of the method for measurement of Embodiment 3 of this disclosure. As shown in FIG. 9, the method includes:

step 901: a driving signal for driving the modulator of the optical transmitter is generated, which comprises at least two frequencies; and step 902: the frequency response characteristics of the optical transmitter and the optical receiver being calculated according to output signal components in output signals of the optical receiver corresponding to at least two detection signal components of identical amplitudes and different frequencies in detection signals; wherein, the detection signals are detection signals being performed photoelectric conversion by the photoelectric detector of the optical receiver.

In this embodiment, the method for generating the driving signal and the method for calculating the frequency response characteristics are identical to those in Embodiment 1, and shall not be described herein any further.

It can be seen from the above embodiment that the optical transmitter and the optical receiver are directly connected, to obtain at least two detection signal components of identical amplitudes and different frequencies in the photoelectrical converted detection signals, and by using the output signal components in the output signals of the optical receiver corresponding to the at least two detection signal components, the frequency response characteristics of the optical transmitter and the optical receiver may be respectively calculated, the amplitude responses and phase responses in the frequency response characteristics may be respectively obtained, and the measurement results are accurate and reliable.

An embodiment of the present disclosure provides a computer readable program code, which, when executed in an apparatus for measurement or electronic equipment, will cause a computer unit to carry out the method for measurement as described in Embodiment 3 in the apparatus for measurement or electronic equipment.

An embodiment of the present disclosure provides a computer readable medium, including a computer readable program code, which will cause a computer unit to carry out the method for measurement as described in Embodiment 3 in an apparatus for measurement or electronic equipment.

The method/apparatus described with reference to the embodiments of the present disclosure may be directly embodied as hardware, a software module executed by a processor, or a combination thereof. For example, one or more of the block diagrams and/or one or more combinations of the block diagrams shown in FIG. 3 may correspond to soft modules of a process of a computer program, and may also correspond to hardware modules. The soft modules may correspond to the steps shown in FIG. 9, respectively, and the hardware modules, for example, may be carried out by firming the soft modules by using a field programmable gate array (FPGA).

The software modules may be located in an RAM, a flash memory, an ROM, an EPROM, and an EEPROM, a register, a hard disc, a floppy disc, a CD-ROM, or any memory medium in other forms known in the art, such as a non-transitory computer readable storage medium. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 3 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. An apparatus for measuring frequency response characteristics of an optical transmitter and an optical receiver, the optical transmitter including a modulator; and the optical receiver including a photoelectric detector, the modulator of the optical transmitter being directly connected to the photoelectric detector of the optical receiver; and signals outputted by the modulator being directly inputted into the photoelectric detector; the apparatus comprising:
a memory that stores a plurality of instructions;
a processor that couples to the memory and causes the apparatus to:
generate a driving signal for driving the modulator of the optical transmitter, which driving signal comprises at least two frequencies, and
calculate frequency response characteristics of the optical transmitter and the optical receiver according to output signal components in output signals of the optical receiver corresponding to at least two detection signal components of identical amplitudes and different frequencies in detection signals,
wherein the detection signals have photoelectric conversion performed by the photoelectric detector of the optical receiver.

2. The apparatus according to claim 1, wherein,
the driving signal is a group of orthogonal frequency division multiplexing symbols comprising at least two orthogonal frequency division multiplexing symbols.

3. The apparatus according to claim 2, wherein,
the orthogonal frequency division multiplexing symbols in the group of orthogonal frequency division multiplexing symbols comprise one or more first subcarriers and one or more second subcarriers; and wherein, power of the second subcarriers is greater than or equal to power of the first subcarriers.

4. The apparatus according to claim 3, wherein,
the group of orthogonal frequency division multiplexing symbols comprises N chronological orthogonal frequency division multiplexing symbols; wherein, for the M-th orthogonal frequency division multiplexing symbol, the first subcarriers are arranged in all even-numbered subcarriers of the M-th orthogonal frequency division multiplexing symbol of frequencies less than or equal to that of a $2^M$-th subcarrier, and the second subcarrier is arranged in a $(2^M+1)$-th subcarrier of the M-th orthogonal frequency division multiplexing symbol; and wherein, M and N are positive integers, and M≤N.

5. The apparatus according to claim 3, wherein,
for the orthogonal frequency division multiplexing symbols, the at least two detection signal components of identical amplitudes and different frequencies in the detection signals are at least two cross terms of the first subcarriers and the second subcarriers in the detection signals.

6. The apparatus according to claim 4, wherein the respectively calculating the frequency response characteristics of the optical transmitter and the optical receiver according to output signal components in output signals of the optical receiver corresponding to at least two detection signal components of identical amplitudes and different frequencies in detection signals includes:
for the first orthogonal frequency division multiplexing symbol, calculating a frequency response characteristic of the optical receiver corresponding to a frequency spot of a fifth subcarrier according to the first subcarrier and the fifth subcarrier of the first orthogonal frequency division multiplexing symbol of the output signal of the optical receiver, and calculating the frequency response characteristic of the optical receiver corresponding to the frequency spot of a third subcarrier according to the frequency response characteristic of the optical receiver corresponding to the frequency spot of the fifth subcarrier and a predetermined frequency response characteristic at the frequency spot of the first subcarrier.

7. The apparatus according to claim 6, wherein the respectively calculating the frequency response characteristics of the optical transmitter and the optical receiver according to output signal components in output signals of the optical receiver corresponding to at least two detection signal components of identical amplitudes and different frequencies in detection signals further includes:
for the M-th orthogonal frequency division multiplexing symbol, calculating the frequency response characteristic of the optical transmitter corresponding to the frequency spot of a $[2^M+1]$-th subcarrier according to all odd-numbered subcarriers in a $[2^{M-1}+1, 2^M-1]$-th subcarrier of the M-th orthogonal frequency division multiplexing symbol in the output signal of the optical receiver; where, $2<M\leq N$;

calculating frequency response characteristics of the optical transmitter corresponding to frequency spots of all even-numbered subcarriers in a $[2^{M-1}+2, 2^M]$-th subcarrier according to all odd-numbered subcarriers in a $[1, 2^{M-1}-1]$-th subcarrier of the M-th orthogonal frequency division multiplexing symbol in the output signal of the optical receiver; where, $2<M\leq N$; and calculating the frequency response characteristics of the optical receiver corresponding to the frequency spots of all odd-numbered subcarriers according to all odd-numbered subcarriers in a $[2^M+3, 2^{M+1}+1]$-th subcarrier of the M-th orthogonal frequency division multiplexing symbol in the output signal of the optical receiver; where, $2<M\leq N$.

8. A method for measuring frequency response characteristics of an optical transmitter and an optical receiver, the optical transmitter including a modulator, and the optical receiver including a photoelectric detector, the modulator of the optical transmitter being directly connected to the photoelectric detector of the optical receiver, and signals outputted by the modulator being directly inputted into the photoelectric detector, the method comprising:

generating a driving signal for driving the modulator of the optical transmitter, which driving signal comprises at least two frequencies; and respectively calculating the frequency response characteristics of the optical transmitter and the optical receiver according to output signal components in output signals of the optical receiver corresponding to at least two detection signal components of identical amplitudes and different frequencies in detection signals;

wherein the detection signals have photoelectric conversion performed by the photoelectric detector of the optical receiver.

9. The method according to claim 8, wherein,
the generated driving signal is a group of orthogonal frequency division multiplexing symbols comprising at least two orthogonal frequency division multiplexing symbols.

10. The method according to claim 9, wherein,
the orthogonal frequency division multiplexing symbols in the group of orthogonal frequency division multiplexing symbols comprise one or more first subcarriers and one or more second subcarriers; and wherein, power of the second subcarriers is greater than or equal to power of the first subcarriers.

11. The method according to claim 10, wherein,
the group of orthogonal frequency division multiplexing symbols comprises N chronological orthogonal frequency division multiplexing symbols; wherein, for the M-th orthogonal frequency division multiplexing symbol, the first subcarriers are arranged in all even-numbered subcarriers of the M-th orthogonal frequency division multiplexing symbol of frequencies less than or equal to that of a $2^M$-th subcarrier, and the second subcarrier is arranged in a $(2^M+1)$-th subcarrier of the M-th orthogonal frequency division multiplexing symbol; and wherein, M and N are positive integers, and $M\leq N$.

12. The method according to claim 9, wherein,
for the orthogonal frequency division multiplexing symbols, the at least two detection signal components of identical amplitudes and different frequencies in the detection signals are at least two cross terms of the first subcarriers and the second subcarriers in the detection signals.

13. The method according to claim 11, wherein the respectively calculating the frequency response characteristics of the optical transmitter and the optical receiver according to output signal components in output signals of the optical receiver corresponding to at least two detection signal components of identical amplitudes and different frequencies in detection signals includes:

for the first orthogonal frequency division multiplexing symbol, calculating a frequency response characteristic of the optical receiver corresponding to a frequency spot of a fifth subcarrier according to the first subcarrier and the fifth subcarrier of the first orthogonal frequency division multiplexing symbol of the output signal of the optical receiver, and calculating the frequency response characteristic of the optical receiver corresponding to the frequency spot of a third subcarrier according to the frequency response characteristic of the optical receiver corresponding to the frequency spot of the fifth subcarrier and a predetermined frequency response characteristic at the frequency spot of the first subcarrier.

14. The method according to claim 13, wherein the respectively calculating the frequency response characteristics of the optical transmitter and the optical receiver according to output signal components in output signals of the optical receiver corresponding to the least two detection signal components of identical amplitudes and different frequencies in detection signals further includes:

for the M-th orthogonal frequency division multiplexing symbol, calculating the frequency response characteristic of the optical transmitter corresponding to the frequency spot of a $[2^M+1]$-th subcarrier according to all odd-numbered subcarriers in a $[2^{M-1}+1, 2^M-1]$-th subcarrier of the M-th orthogonal frequency division multiplexing symbol in the output signal of the optical receiver; where, $2<M\leq N$;

calculating frequency response characteristics of the optical transmitter corresponding to frequency spots of all even-numbered subcarriers in a $[2^{M-1}+2, 2^M]$-th subcarrier according to all odd-numbered subcarriers in a $[1, 2^{M-1}-1]$-th subcarrier of the M-th orthogonal frequency division multiplexing symbol in the output signal of the optical receiver; where, $2<M\leq N$; and calculating the frequency response characteristics of the optical receiver corresponding to the frequency spots of all odd-numbered subcarriers according to all odd-numbered subcarriers in a $[2^M+3, 2^{M+1}+1]$-th subcarrier of the M-th orthogonal frequency division multiplexing symbol in the output signal of the optical receiver; where, $2<M\leq N$.

* * * * *